United States Patent [19]

Vranish

[11] Patent Number: 5,120,101
[45] Date of Patent: Jun. 9, 1992

[54] ROLLING FRICTION ROBOT FINGERS

[75] Inventor: John M. Vranish, Crofton, Md.

[73] Assignee: The United States of America as represented by the Administrator of the National Aeronautics and Space Administration, Washington, D.C.

[21] Appl. No.: 628,529

[22] Filed: Dec. 17, 1990

[51] Int. Cl.[5] .............................................. B66C 1/62
[52] U.S. Cl. ................................ 294/119.1; 294/902; 901/39
[58] Field of Search ............................ 294/119.1, 902; 269/265, 266, 267, 275; 901/31, 39

[56] References Cited

U.S. PATENT DOCUMENTS

| | | | |
|---|---|---|---|
| 1,405,325 | 1/1922 | Posch | 269/267 X |
| 3,856,292 | 12/1974 | Merola | 269/275 X |
| 4,353,537 | 10/1982 | Koufos | 269/266 |
| 4,475,607 | 10/1984 | Haney | 294/902 X |
| 4,505,614 | 3/1985 | Anschutz | 294/902 X |
| 4,546,681 | 10/1985 | Owsen | 294/902 X |
| 4,653,793 | 3/1987 | Guinot et al. | 294/86.4 |

FOREIGN PATENT DOCUMENTS 1227463 4/1986 U.S.S.R. ................................ 901/39

OTHER PUBLICATIONS

"NASA's First Dexterous Space Robot", Aerospace America, Feb. 1990.

Primary Examiner—Margaret A. Focarino
Assistant Examiner—Dean J. Kramer
Attorney, Agent, or Firm—R. Dennis Marchant; John R. Manning; Paul S. Clohan

[57] ABSTRACT

A low friction, object guidance, and gripping finger device for a robotic end effector on a robotic arm, having a pair of robotic fingers each having a finger shaft slideably located on a gripper housing attached to the end effector, each of the robotic fingers having a roller housing attached to the finger shaft. The roller housing has a ball-bearing mounted centering roller located at the center, and a pair of ball bearing mounted clamping rollers located on either side of the centering roller. The object has a recess to engage the centering roller and a number of seating ramps for engaging the clamping rollers. The centering roller acts to position and hold the object symmetrically about the centering roller with respect to the X axis and the clamping rollers act to position and hold the object with respect to the Y and Z axis.

6 Claims, 15 Drawing Sheets

ROLLING FRICTION ROBOT FINGERS

ORIGIN OF THE INVENTION

The invention described herein was made by an employee of the United States Government and may be manufactured and used by or for the Government for governmental purposes without the payment of any royalties thereon or therefore.

TECHNICAL FIELD

This invention relates to an object gripping device for robotic applications and more specifically relates to a low friction object guidance and gripping finger unit for a robotic end effector for a robotic arm.

BACKGROUND ART

Great efforts have been made to make improvements in the design of robotic grippers; however, end effectors, or hands, for robotic arms continue to be a limiting element for efficient use of the robotic grippers. Frequently, robot grippers for space use employ finger elements containing "V" grooves to grip an object. These "V" grooves are used to both guide the object into place within the robot finger mechanism and to grasp and lock the object in that position once the object is securely in place. The "V" groove grippers have a frictional component at the interface between the object being grasped and the gripper finger. This frictional component causes several problems in the grasping process itself. First, it causes wear between the gripper finger and the object being grasped which, in its turn, rapidly leads to "burring" and contamination on both members. This frictional component also increases the force which the gripper motor must employ to pull the object in and seat it. This increase in the required force also translates into increased motor power and thermal control problems for the gripper motor. And, it reduces the effectiveness of the grooves in the robot finger to perform as a guide for aligning the grasped object with the robot fingers. Also, the frictional component confuses the force sensors associated with the gripper. The sensors are really detecting the vectorial sum of the grasping force plus the friction. But, friction is very unpredictable, thus sensor measurement accuracy is adversely affected. Also, as the object is pulled into the grasp of the fingers, the frictional component changes sporadically between static and dynamic friction causing a skipping effect which further confuses the sensors. Finally, the friction present when "V" groove fingers grasp an object can make it difficult for the gripper to release that object. This problem appears when the robot does not completely release the side loads and torques on the gripper before attempting to open the gripper jaws.

An alternate form of the "V" groove scheme is the pins and cones method wherein the cone acts as a multiple "V" groove, centering the object in the x, y, and z-axes; and allowing rotation about the x-axis and rotation about the y-axis. The pin resolves the rotation about the z-axis.

For large space robots such as those used on the Space Shuttle (for example the Shuttle Remote Manipulator System (RMS)), a snare technique is used to capture an object. The snare itself is comprised of two or more wire rods with hooked or curved ends mounted to a common housing. To capture an object or payload, the wire rods are rotated toward one another such that the edge of the rods having the hooked or curved ends engage the payload and pull the payload into the housing and hold the payload securely in position.

The snare system used in the RMS has disadvantages that differ from those of the "V" groove fingers. The snare system was primarily designed to capture spinning satellites in space; it has no frictional component when it grasps an object in space. However, the snaring process is a complex one because 1) the end effector requires a relatively long axial length to have enough range to search out and locate an object; 2) the several motors and gears located within the end effector are difficult to control such that an operator can manipulate the gripper with the precision movement necessary to quickly and efficiently grasp an object; 3) the end effector must also employ separate latches to secure the object once it is pulled in by the snare.

The apparatus disclosed in the instant invention overcomes the shortcomings of the "V" groove and snare grippers by providing an end effector gripper that will, with very low frictional forces, effectively guide, align and seat an object in a desired position without causing "burrs" or contamination that will damage the object.

STATEMENT OF THE INVENTION

It is therefore an object of the present invention to provide a set of fingers for a robot gripper, or attachment and stabilizing system for a robot as a whole that will improve the gripper's ability to more effectively grasp an object.

It is another object of the present invention to provide a robot gripper that has a low frictional component at the interface between the object being grasped and the gripper fingers.

It is a further object of this invention to provide a robot gripper that does not cause "burring" to the object being grasped nor the gripper finger element.

It is still another object of this invention to provide a robot gripper that does not damage or contaminate the object being grasped.

It is still a further object of this invention to provide an improved robot gripper that smoothly and efficiently guides, aligns and securely seats an object in the desired position within the end effect apparatus despite large misalignments.

It is an additional object of this invention to provide an improved robot gripper that will more accurately transmit the magnitude of vector component forces present within the grasped object to force sensors associated with the gripper mechanism, thereby improving the sensor's signal-to-noise ratio and making the sensor readings more clear and predictable.

It is another object of this invention to provide an improved robot gripper that is reliable and durable in operation that is also easily and inexpensively constructed relative to other robot grippers utilized in space applications.

It is a further an object of this invention to provide an improved robot gripper that will roll easily away from and reliably release an object subjected to side forces and torques.

The foregoing objects and others are achieved by providing a pair of robot gripper fingers, which move towards each other trapping an object being grasped between them. A central roller locates the object being grasped with respect to the X coordinate. Final location of the object being grasped is provided by final locating rollers. The object being grasped has a receptacle for the central roller and locating ramps for the final locating rollers. A margin of safety in securing the grasp is provided even if the final locating rollers should roll off the locating ramps. A provision for allowing for corrections in misalignments about the Z axis without binding between the fingers and the object being grasped is also incorporated into the design.

The mode of operation is as follows. The robot moves the gripper such that the fingers are one on each side of the object to be grasped. The gripper then moves the fingers towards each other. In this discussion, it is assumed that the left finger encounters the object first (the sequence is merely reversed if the right finger make the initial contact). The central roller of the left finger thus contacts one edge of the central roller receptacle. As the gripper fingers continue towards each other, the central roller of the left finger begins centering the object with respect to the X axis. Soon afterwards the central roller of receptacle begins centering the object with respect to the X axis from the other side. At this point the object is centered with respect to X to the uncertainty of the clearance between the central rollers and the central roller receptacles As the gripper fingers continue towards each other, the final locating rollers begin to encounter parts of the object being grasped. This series of encounters begins to align the object and fingers with respect to Y and twist about Z. Next, the final locating rollers begin to contact the final locating ramps. Since this is happening on both sides of the object being grasped, twist about Y is taken out. When the forces on all eight final locating rollers are equal the motion of the gripper fingers is stopped and location with respect to Z is set as are the final locations of the other five vectorial components (twist about Z and X, twist about X and Y, twist about Y). The forces on the final locating rollers and the reactions to these forces on the final locating ramps of the grasped object set up a frictional grasp of the object which is rattle-free. This frictional grasp is backed up by mechanical interference (safety features) in every vectorial component except Z which is a function of the gripper drive. Several standard techniques can be used to provide a mechanical interference in Z such as employing a nonback-drivable acme screw in the griper drive.

DETAILED DESCRIPTION OF THE INVENTION

Figure 1:
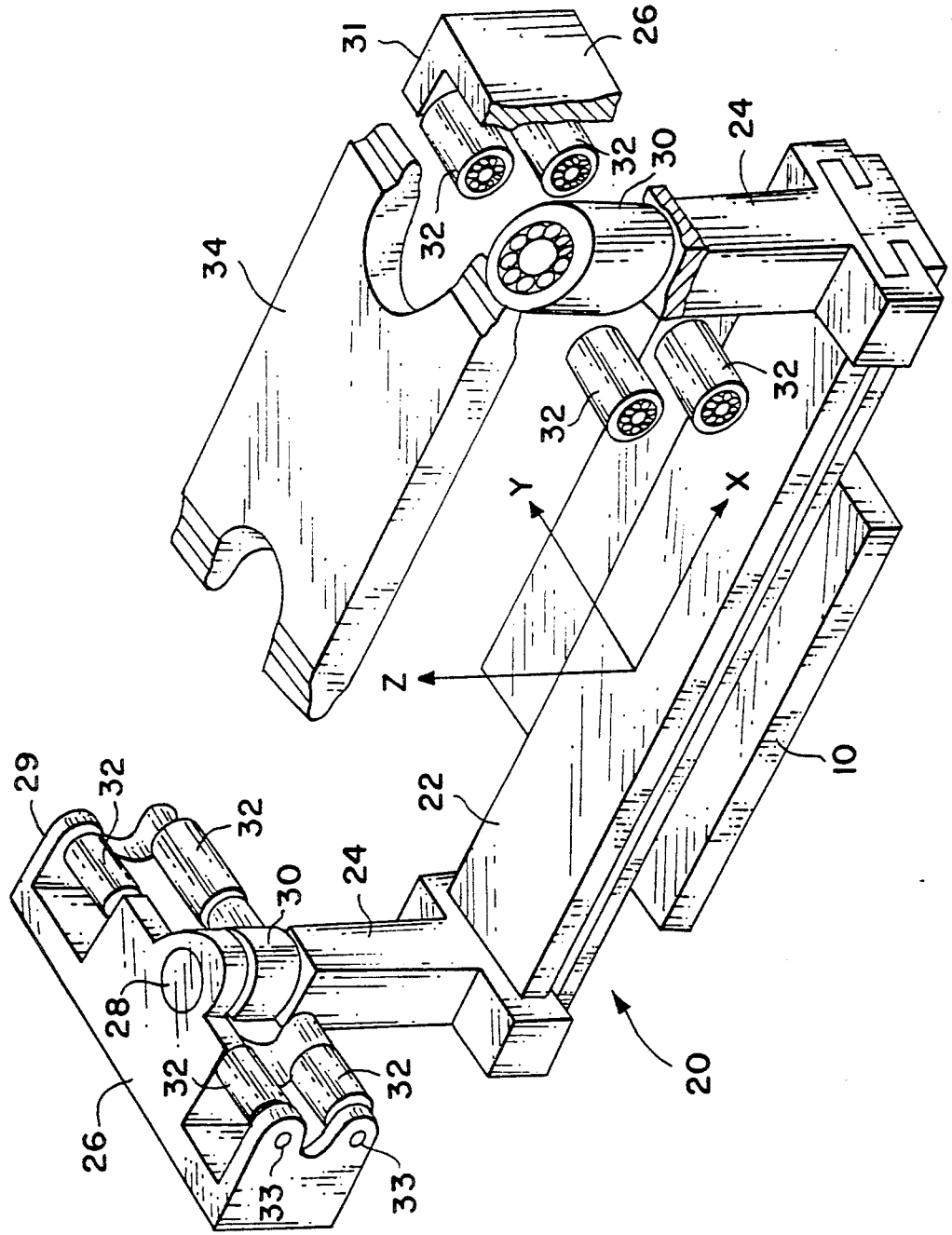
FIG. 1 is a perspective view of a rolling friction finger mechanism according to the teachings of the present invention.

In the preferred embodiment the rolling friction finger mechanism is shown generally at 20 in FIG. 1. The gripper housing 22 is attached to a robotic end effector 10 (shown schematically) in a standard manner which is well known in this art. Attached at each end of the gripper housing 22 is a finger shaft 24 upon which is mounted a roller housing 26 which supports centering roller 30 and four clamping rollers 32 to form one finger of the rolling friction finger mechanism 20; the left finger is thus shown as item 29 and the right finger is shown as item 31 thereby forming a pair of opposed parallel throw robotic fingers mounted via gripper housing 22 to end effector 10. Centering roller 30 is supported by a standard bearing shaft assembly 28 (which will be shown and described in greater detail later) and each clamping roller 32 is supported by a standard bearing shaft assembly 33 (to be shown in greater detail later). The four clamping rollers 32 on each finger are mounted in two pairs that are positioned symmetrically about centering roller 30. A specially designed object to be grasped shown at 34 is what is to be grasped by the rolling friction finger mechanism 20. Object 34 can be a part of or mounted to a much larger object that is to be manipulated by the robot, such as a piece of structural material, a satellite an electronic device, etc. Thus in this invention there is a pair of opposed parallel throw robot fingers (29 and 31) which move towards each other trapping the object 34 to be grasped. Centering roller 30 is used to locate the object 31 to be grasped and the four clamping rollers 32 are used for the final location or seating of object 34.

Figure 2A:
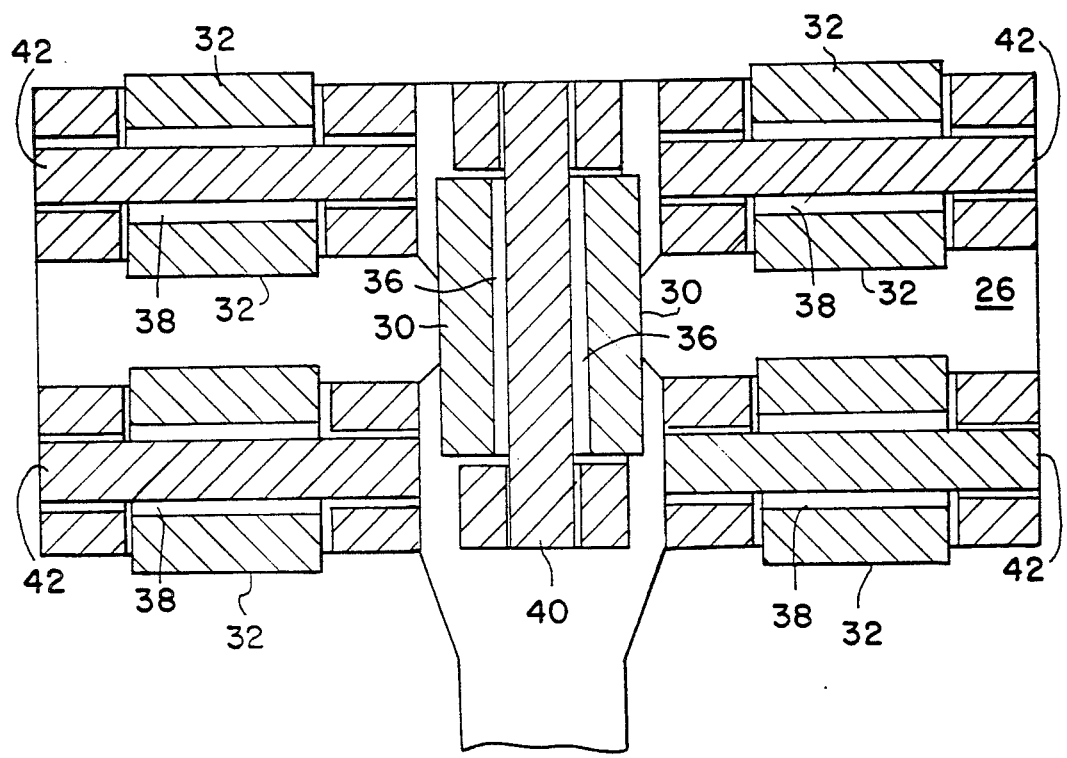
FIGS. 2a and 2b are face and top cross-sectional views of the left or right finger of the mechanism shown i- FIG. 1.
Figure 2B:
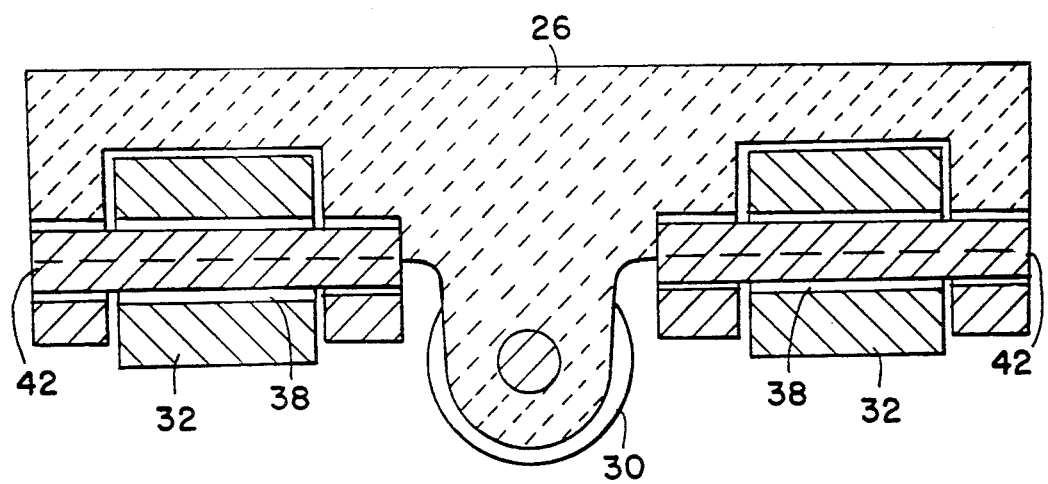

FIGS. 2a and 2b show face and top cross-sectional views of the left or right finger showing the internal construction and design of roller housing 26, centering roller 30 and clamping rollers 32. Centering roller 30 is supported by bearing 36 including bearing race or shaft 40. Each clamping roller 32 is supported by bearing 38 and bearing race or shaft 42.

Figure 3A:
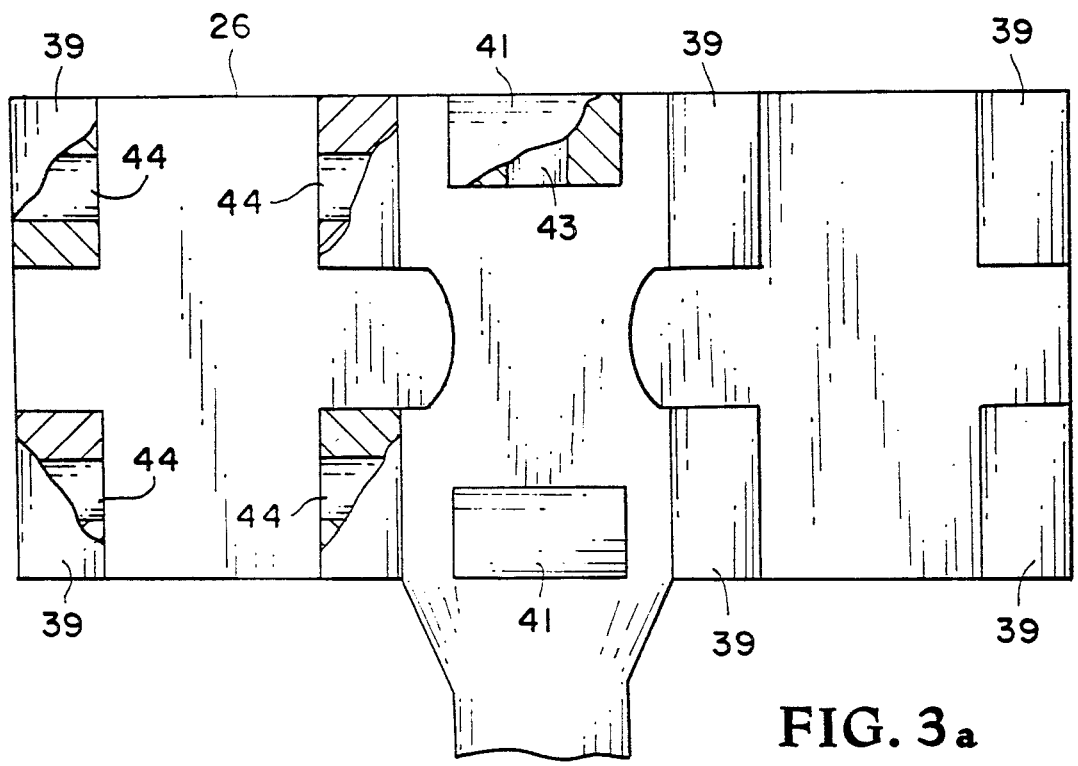
FIGS. 3a and 3b are face and side views of the roller housing of the left or right finger shown in FIGS. 2a and 2b.
Figure 3B:
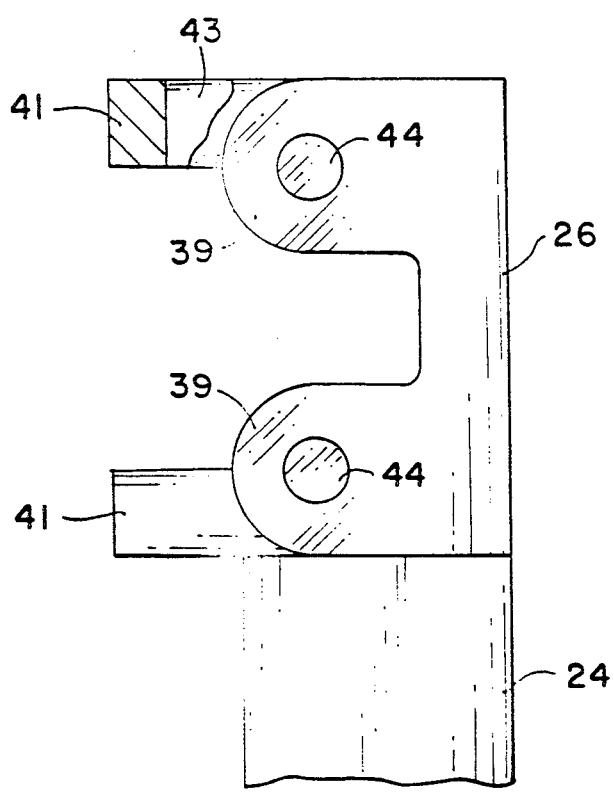

FIGS. 3a and 3b show face and side views of roller housing 26 with the clamping rollers 32, centering roller 30, and their respective bearings removed. The clamping rollers are mounted in clamping roller retainers 39 containing orifices 44 in which a clamping roller bearing shaft 42 is inserted. The centering rollers are mounted in centering roller retainers 41 containing orifices 43 in which the centering roller bearing shaft 40 is inserted.

Figure 4B:
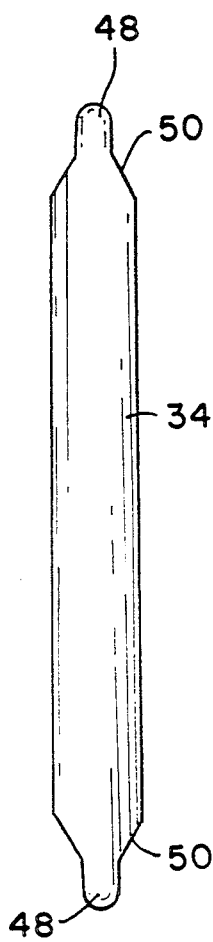
FIGS. 4a, 4b and 4c are illustrations of an object to be grasped showing the object's end view, front view and top view, respectively.
Figure 4C:
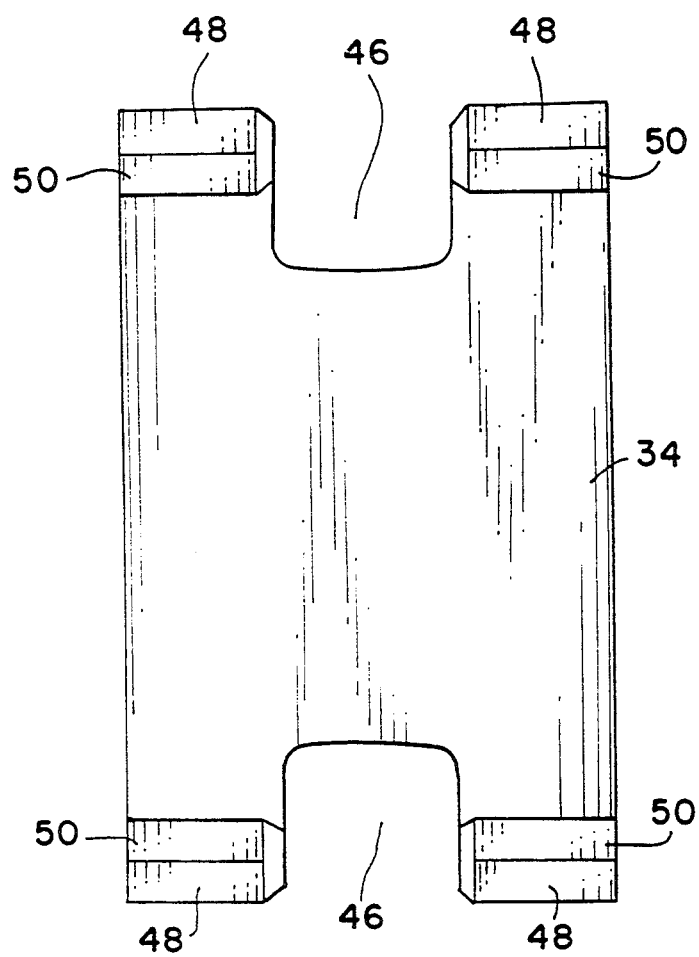
Figure 4A:
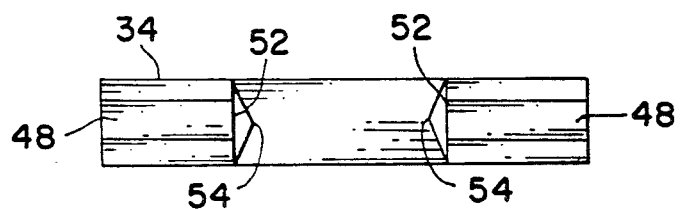

The object 34 to be grasped by the rolling friction finger mechanism 20 is shown in three dimensional views i- FIGS. 4a, 4b and 4c. Object 34 has to be specially designed with a number of "engagements" so that it can be grasped and clamped or seated by the left and right finger centering and clamping rollers. For this embodiment object 34 has an oblong, substantially rectangular shape with two engagements or recesses 46 at each end along length segment of object 34. To enable the clamping rollers 32 to clamp or seat object 34, another engagements, a safely lip 48, is provided which has a wedge or seating ramp 50 upon which clamping rollers 32 will rest when object 34 is properly located in its final clamped or seated position. Recess 46 has tilt ramps 52 along opposing edges. Each tilt ramp 52 also has a centering boss 54 positioned at the apex of tilt ramp 52. The tilt ramps 52 and centering bosses 54 facilitate the engagement of centering roller 30 with object 34 by providing an initial contact point or surface for centering roller 30 to allow for corrections in misalignments of object 34 with respect to the vertical axis.

Figure 5:
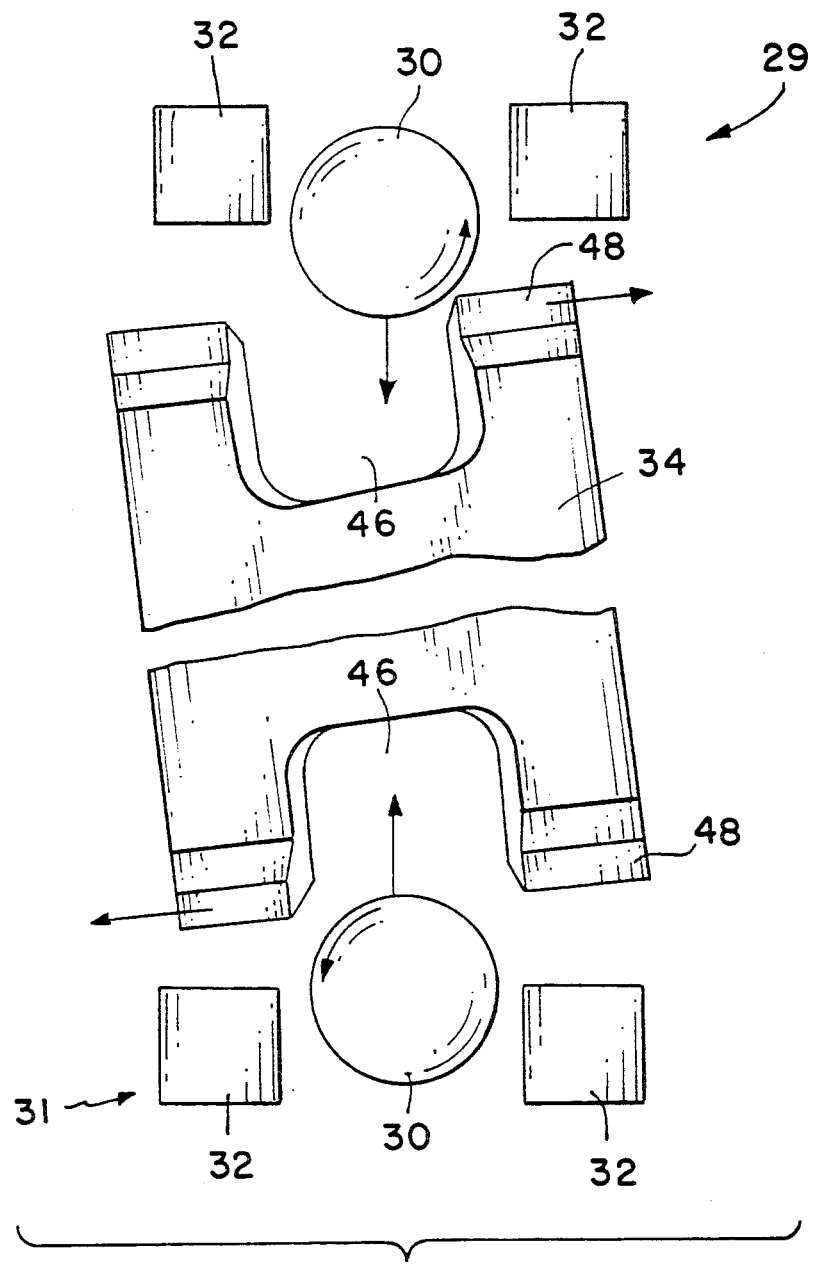
FIG. 5 is a top schematic view of the rolling friction finger mechanism rollers at the initial stage of grasping the object shown in FIG. 4.

The mode of operation of the rolling friction finger mechanism 20 is shown in FIGS. 5 through 9. FIG. 5 is a top view of the rolling friction finger mechanism 20, as shown in FIG. 1, shown at the initial stage of grasping object 34. The robot moves the rolling friction finger mechanism 20 such that the object to be grasped 34 is positioned between the left finger 29 and right finger 31. The rolling friction finger mechanism 20 then moves the left and right fingers 29 and 31 toward the object 34 to be grasped. In this example, it will be assumed that the left finger 29 makes initial contact with object 34; however, the sequence would simply be reversed if the right finger 31 made the initial contact with object 34. Centering roller 30 of the left finger 29 will make initial contact with object 34 at one edge of recess 46 near the object's safety lip 48. It should be noted that centering roller 30 has the ability to rotate either clockwise or counterclockwise depending upon which way object 34 must be guided to draw or guide object 34 into finger units 29 or 31. As the left and right fingers 29 and 31 continue to move toward each other, centering roller 30 of finger 29, in this case, will rotate counterclockwise as shown by the arrow, thereby engaging object 34 at safety lip 48 and steering or guiding centering roller 30 of left finger 29 in one recess 46 of object 34. One end of object 34 will now be positioned symmetrically about centering roller 30 with respect to the x-axis in the horizontal plane. It should be noted that the rolling friction finger mechanism is designed or positioned such that it has two axes in the horizontal plane, an x-axis and a y-axis which are orthogonal to one another; and it has a z-axis in the vertical plane, as shown in FIG. 1.

Figure 6:
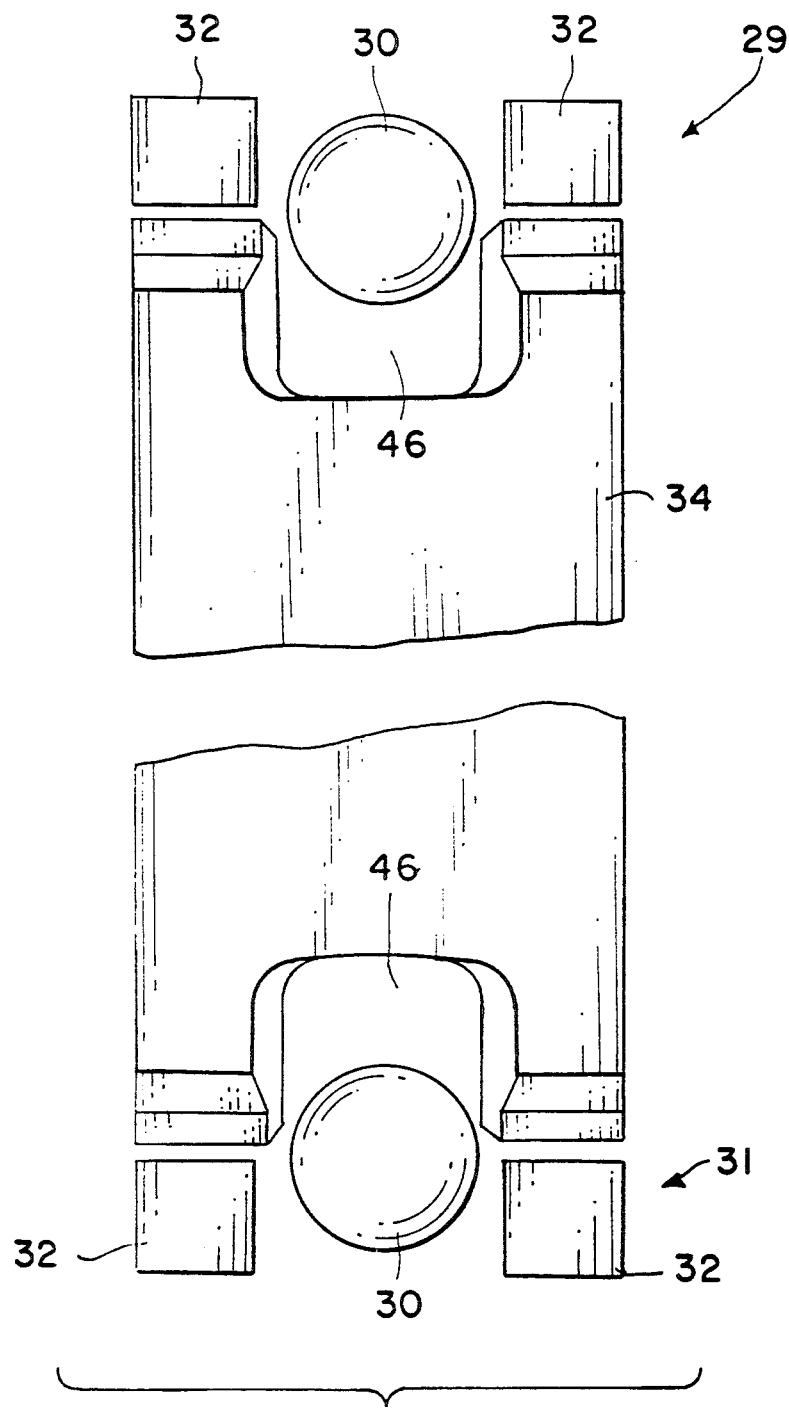
FIG. 6 is a top schematic view of the rolling friction finger mechanism with the centering rollers engaged or grasping the object of FIG. 4.

Next, the centering roller 30 of the right finger 31 will make contact with the opposite end of object 34 at one edge of recess 46 near the object's safety lip 48. Centering roller 30 of finger 31 will also rotate counterclockwise as shown by the arrow, thereby engaging object 34 at safety lip 48 and steering or guiding centering roller 30 of right finger 31 into the second recess 46 of object 34. As fingers 29 and 31 continue moving toward each other, the ends of object 34, as is shown in FIG. 6, will now also be positioned symmetrically about centering roller 30 of gripper unit 31 with respect to the x-axis in the horizontal plane. And, at this point in time, object 34 is now centered about both centering rollers 30 with respect to the x-axis in the horizontal plane; also some of the twist of object 34 with respect to the z-axis is now eliminated.

Figure 7:
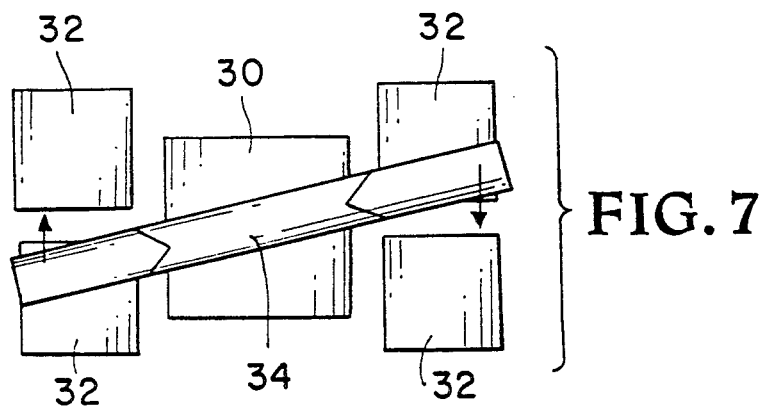
FIG. 7 is an end schematic view depicting now the clamping rollers of the rolling friction finger mechanism initially contact or grasp the object of FIG. 4.
Figure 8:
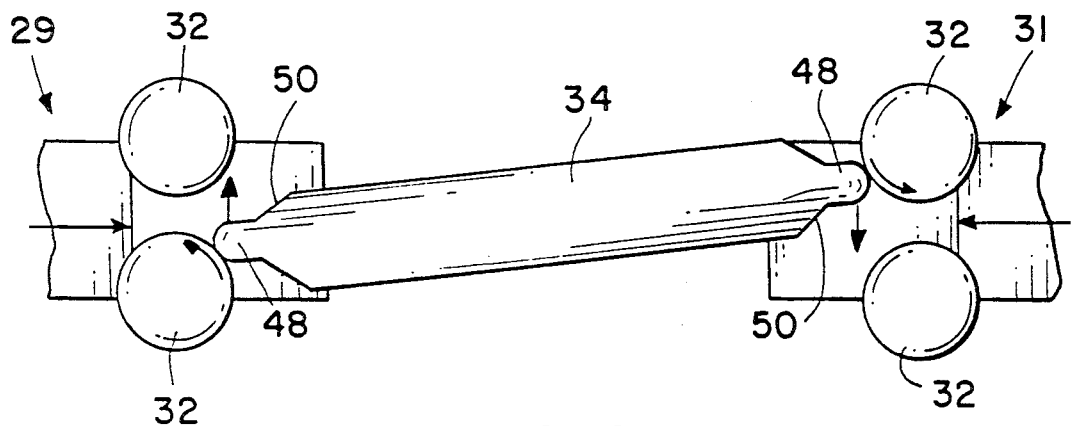
FIG. 8 is a side view illustration depicting how the clamping rollers of the rolling friction finger mechanism initially contact or grasp the object of FIG. 4.

As the fingers 29 and 31 still continue moving toward each other, the final locating rollers, clamping rollers 32, begin to make contact with object 34 as is shown in FIGS. 7 and 8. The top row of each pair of clamping rollers 32 rotate counterclockwise to encounter and draw the edge of object 34, safely lip 48, into the recessed area between the pairs of clamping rollers; conversely, the bottom row of each pair of clamping rollers 32 rotate clockwise to guide safety lip 48 of object 34. This series of encounters of clamping rollers 32 with safety lips 48 begins to align object 34 and fingers 29 and 31 with respect to the horizontal y-axis and further reduces twist about the vertical z-axis.

Figure 9:
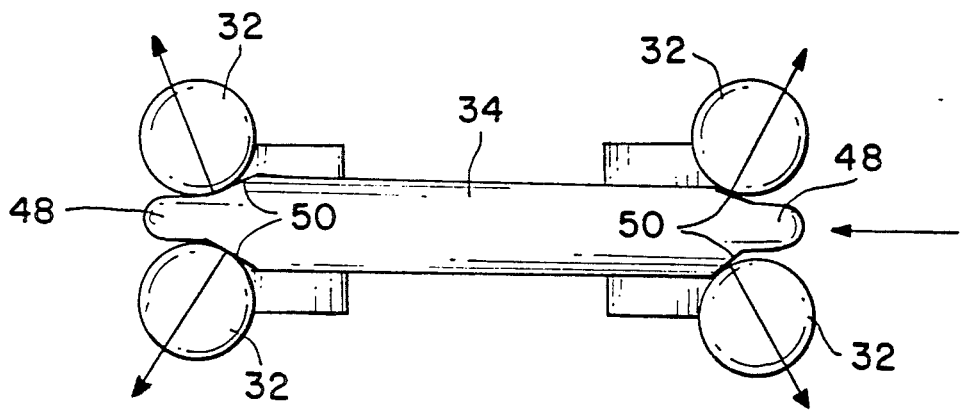
FIG. 9 is a side view illustration depicting the clamping rollers of the rolling friction finger mechanism grasping the object of FIG. 4 in the clamping rollers final setting or locking position.
Figure 10:
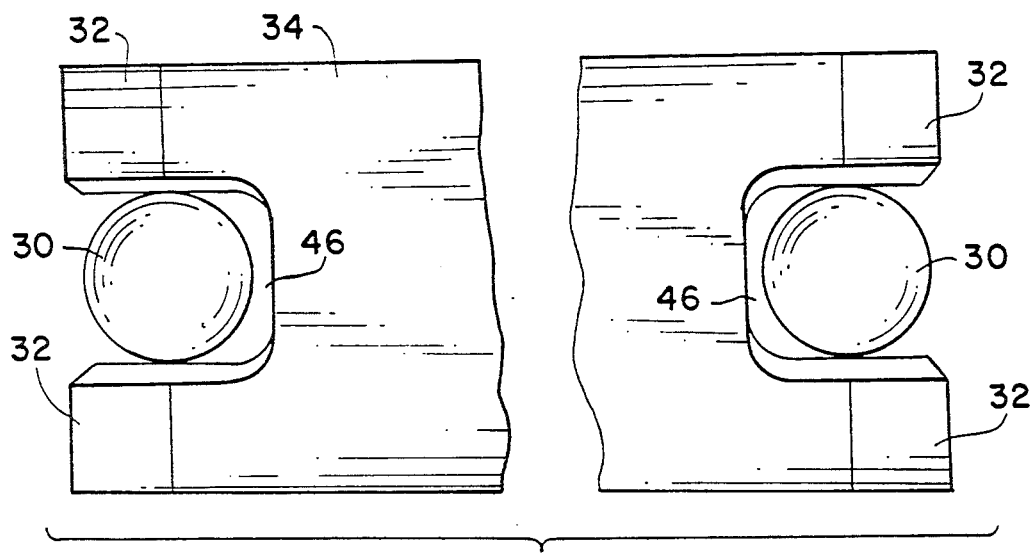
FIG. 10 is a top schematic view depicting the clamping rollers of the rolling friction finger mechanism grasping the object of FIG. 4 in the clamping rollers final seating or locking position.
Figure 11:
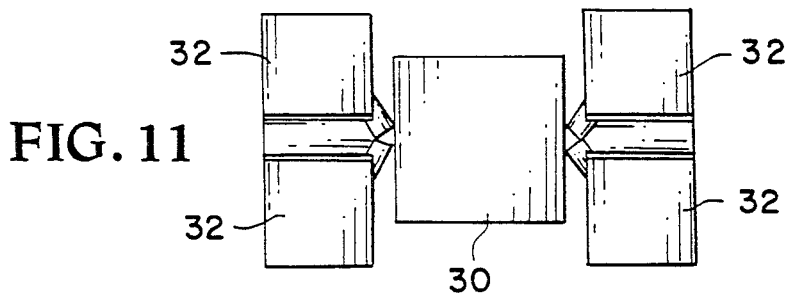
FIG. 11 is an end schematic view depicting the clamping rollers of the rolling friction finger mechanism grasping the object of FIG. 4 in the clamping rollers final seating or locking position.

Next clamping rollers 32 continue to move in or close in on object 34 until contact is made with the seating ramps 50 of object 34 as is shown in FIGS. 9, 10 and 11. Because the engagement is happening on both sides of object 34, the twist of object 34 with respect to the vertical z-axis is now eliminated. When the forces on all eight of the clamping rollers 32 are equally distributed with respect to object 34, the motion of fingers 29 and 31 is stopped and the location of object 34 with respect to the vertical z-axis is set as are the final locations of the other five vectorial components (twist about the z-axis, the x-axis, twist about the x-axis, the y-axis, and twist about the y-axis). The forces on the clamping rollers 32 in the final locating mode and the reactions to these forces on the final locating ramps 50 of the grasped object 34, set up a frictional grasp of object 34 which is rattle-free. This frictional grasp is backed up by mechanical interference (i.e., safety features) in every vectorial except the z-axis component which is a function of the gripper drive. Several standard techniques can be used to provide a mechanical interference in the z-axis component such as by employing a non-back-drivable acme screw in the gripper drive.

Roller Bearing Design and Operation

Figure 12:
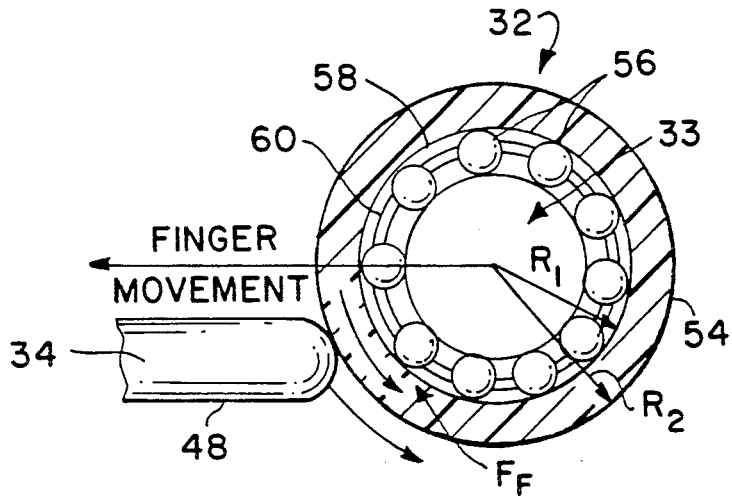
FIG. 12 is a side view of a typical clamping roller illustrating how it directs the object of FIG. 4.

To understand the theory of operation of this invention, an explanation of the internal roller bearing design and operation will be helpful. FIG. 12 illustrates the internal components of a typical clamping roller 32 and shows how it directs or guides object 34. The outer ring 54 of clamping roller 32 is made of a resilient material such as rubber or plastic and is mounted on a bearing mechanism which in this instance are recirculating needle bearings 56. Needle bearings 56 are mounted onto or supported by inner race 33 and are contained within bearing cage 60. Outer race 58 surrounds needle bearings 56 and abuts the inside of outer ring 54.

Figure 13:
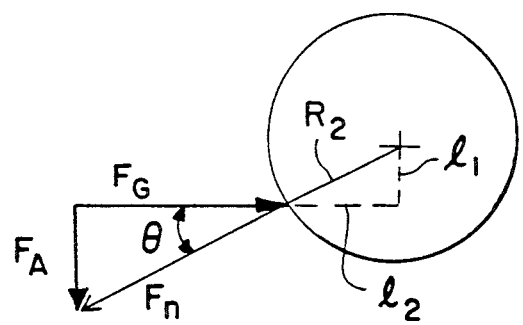
FIG. 13 is a force and displacement diagram illustrating component force and displacement relationships for the clamping roller and object of FIG. 12.

In this example, clamping roller 32 is rotating counter-clockwise (as shown by the arrow) as it moves to the left and makes contact with the safety lip 48 of object 34, thereby creating a frictional force, $F_f$, at the interface of outer race 58 and needle bearings 56 of roller 32. FIG. 13 diagrammatically illustrates the component force and displacement relationships for the clamping roller 32 and object 34 of FIG. 12, where:

- $F_g$ = the force exerted from object 34 (gripping force).
- $F_n$ = the normal reaction force of roller 34 to the gripping force, $F_g$.
- $F_A$ = the alignment force.
- $R_1$ = the radius of outer race 58.
- $R_2$ = the radius of outer ring 54 of roller 32.
- $l_1$ = the displacement of Fe from the center line along the y-axis.
- $l_2$ = the displacement of Fe from the center line along the x-axis.
- $\Theta$ = angle of incidence (object 34 relative to roller 32).

The effectiveness of the rolling friction finger is measured by a term called the Figure of Merit for Alignment (FMA), which is defined as (referring to FIG. 13) the alignment force divided by the gripping force. Thus, $$FMA = F_A/F_G \quad \text{(Equation 1)}$$

It can be shown that:

$$T_A = 2F_G R_2 \sin \Theta - T_F \quad \text{(Equation 2)}$$

where:
$T_A$ = Alignment torque and:
$T_F$ = Torque due to friction ($F_F \times R_1$) (Refer to FIG. 12).

Thus:

$$F_A = 2F_G \sin \Theta - (F_G \mu_S/\cos \Theta) \times (R_1/R_2)$$

where:
$\mu_S$ = Coefficient of rolling friction between inner race 33 and outer ring 54 as shown in FIG. 12, and $$FMA = 2 \sin \Theta - (\mu_R/\cos \Theta) \times (R_1/R_2) \quad \text{(Equation 3)}$$

However, the robot force sensors will detect any $F_G \cos \Theta > 5$ pounds and allow the robot arm to comply such that the sensors will detect the greater force of the following two equations:

$$FMA = 2 \sin \Theta - ((\mu_R/\cos \Theta) - (R_1/R_2)) \quad \text{(Equation 4A)}$$

or $$FMA = 2 \sin \Theta 31 \, (5/F_G) \times (R_1/R_2). \quad \text{(Equation 4B)}$$

Normally the ratio of $R_1/R_2$ is less than ¾ or 0.75, therefore the sensors will again detect the greater force of the following two equations:

$$FMA = 2 \sin \Theta - (\mu_R/\cos \Theta) \times (\tfrac{3}{4}) \quad \text{(Equation 5A)}$$

or $$FMA = 2 \sin \Theta - (5/F_G) \times (\tfrac{3}{4}) \quad \text{(Equation 5B)}$$

For recirculating bearings, $\mu_R$ is approximately equal to 0.008 or approaching a value of 0.01; therefore, the sensors will again detect the greater force of the following two equations:

$$FMA = 2 \sin \Theta - (0.0075/\cos \Theta) \quad \text{(Equation 6A)}$$

or $$FMA = 2 \sin \Theta - (0.0375/F_G) \quad \text{(Equation 6B)}$$

Table 1 shows the range of values of FMA for the rolling friction under typical operating conditions as is described in Equations 1 through 6 and FIG. 13. In Table 1 $F_G$ has a value of 20 pounds, $\mu_R$ has values of 0.01 and 0.05 and $\Theta$ has a range of 0 to 90 degrees.

TABLE 1

| $\mu_R = 0.01$ $F_G = 20$ lbs. | | | $\mu_R = 0.05$ $F_G = 20$ lbs. | | |
|---|---|---|---|---|---|
| FMA | $\Theta°$ | 0.0075 Cos $\Theta$ | FMA | $\Theta°$ | 0.0375 Cos $\Theta$ |
| 0.1668/0.1724 | 5 | .00753 | 0.1367/0.1724 | 5 | 0.03764 |
| 0.3397/0.3454 | 10 | .00762 | 0.3092/0.3454 | 10 | 0.03808 |
| 0.6761/0.6822 | 20 | .00798 | 0.6441/0.6822 | 20 | 0.03991 |
| 0.9913/0.9981 | 30 | .00866 | 0.9567/0.9981 | 30 | 0.04330 |
| 1.2758/1.2837 | 40 | .00979 | 1.2366/1.2837 | 40 | 0.04895 |
| 1.5204/1.5302 | 50 | .01167 | 1.4737/1.5302 | 50 | 0.05834 |
| 1.7171/1.7302 | 60 | .01500 | 1.6571/1.7302 | 60 | 0.07500 |
| 1.8575/1.8775 | 70 | .02193 | 1.7697/1.8775 | 70 | 0.10964 |
| 1.9264/1.9677 | 80 | .04319 | 1.7537/1.9677 | 80 | 0.21595 |
| 1.9274/1.9735 | 81 | .04794 | 1.7357/1.9735 | 81 | 0.23972 |
| 1.9266/1.9787 | 82 | .05389 | 1.7111/1.9787 | 82 | 0.26945 |
| 1.9236/1.9832 | 83 | .06154 | 1.6774/1.9832 | 83 | 0.30771 |
| 1.9173/1.9872 | 84 | .07175 | 1.6303/1.9872 | 84 | 0.35875 |
| 1.9063/1.9905 | 85 | .08605 | 1.5621/1.9905 | 85 | 0.43026 |
| 1.8876/1.9933 | 86 | .1075 | 1.4575/1.9933 | 86 | 0.53758 |
| 1.8540/1.9954 | 87 | .1433 | 1.2807/1.9954 | 87 | 0.71652 |
| 1.7839/1.9969 | 88 | .2149 | 0.9243/1.9969 | 88 | 1.0745 |
| 1.5700/1.9978 | 89 | .4297 | −1.4901/1.9978 | 89 | 2.1487 |
| −∞/1.9981 | 90 | ∞ | −∞/1.9981 | 90 | ∞ |

COMPARISON OF ROLLING FRICTION FINGERS WITH "V" GROOVE TYPE FINGERS

Figure 14:
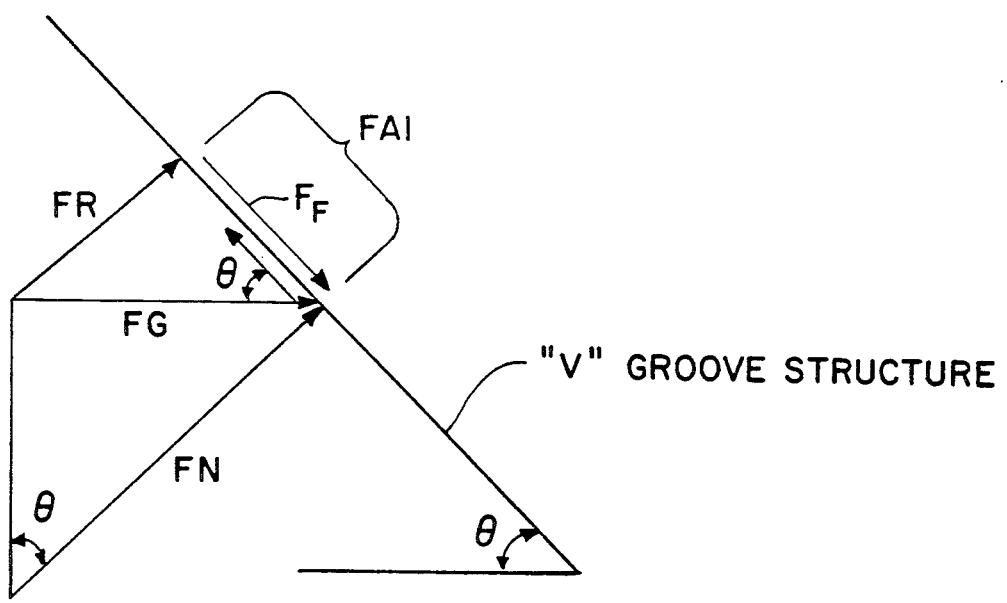
FIG. 14 is a force and displacement diagram illustrating component force and displacement relationships for the prior art "V" groove type finger.

The alignment properties of the rolling friction finger are far superior to those of the "V" groove type finger. Referring to FIG. 14, where
  FN = the normal force to the "V" groove structure;
  FG = the gripping force;

FA = the effective alignment force, (FA1−$F_f$);
FR = the finger reaction force;
$F_F$ = the frictional force between the object and the gripper finger; and
FA1 = the alignment force neglecting friction.
It can be shown that:

$$FMA = FA/FG = \cos\Theta - \mu \sin\Theta \quad \text{(Equation 7)}$$

where
  $\mu$ = the coefficient of friction between the object being grasped and the gripper finger, and it can be $\mu_{static}$ or $\mu_{dynamic}$ depending upon the operating circumstances.

Table 2 shows the range of values for FMA for sliding friction ("V" groove) fingers for various angles of incidence and static coefficients of friction based on Equation 7 and FIG. 14; here $\mu_1$ to $\mu_5$ are varying values of the static coefficient of friction.

TABLE 2

| Θ | $\mu_1$ | FMA | $\mu_2$ | FMA | $\mu_3$ | FMA | $\mu_4$ | FMA | $\mu_5$ | FMA |
|---|---|---|---|---|---|---|---|---|---|---|
| 5 | .08 | .9892 | .2 | .9788 | .3 | .9701 | .4 | .9613 | .5 | .9526 |
| 10 | " | .9709 | " | .9501 | " | .9327 | " | .9154 | " | .8980 |
| 15 | " | .9452 | " | .9142 | " | .8883 | " | .8624 | " | .8365 |
| 20 | " | .9123 | " | .8713 | " | .8371 | " | .8029 | " | .7687 |
| 25 | " | .8725 | " | .8218 | " | .7795 | " | .7373 | " | .6950 |
| 30 | " | .8260 | " | .7660 | " | .7160 | " | .6660 | " | .6160 |
| 35 | " | .7733 | " | .7044 | " | .6471 | " | .5897 | " | .5324 |
| 40 | " | .7146 | " | .6375 | " | .5732 | " | .5089 | " | .4447 |
| 45 | " | .6505 | " | .5657 | " | .4950 | " | .4243 | " | .3536 |
| 50 | " | .5815 | " | .4896 | " | .4130 | " | .3364 | " | .2598 |
| 55 | " | .5080 | " | .4098 | " | .3278 | " | .2459 | " | .1640 |
| 60 | " | .4307 | " | .3268 | " | .2402 | " | .1536 | " | .0670 |
| 65 | " | .3501 | " | .2414 | " | .1507 | " | .0601 | " | −.0305 |
| 70 | " | .2668 | " | .1541 | " | .0601 | " | −.0339 | " | −.1278 |
| 75 | " | .1815 | " | .0656 | " | −.0310 | " | −.1276 | " | −.2241 |
| 80 | " | .0949 | " | −.0233 | " | −.1218 | " | −.2203 | " | −.3188 |
| 85 | " | .0075 | " | −.1121 | " | −.2117 | " | −.3113 | " | −.4109 |
| 90 | " | −8e$^{-2}$ | " | −.2000 | " | −.3000 | " | −.4000 | " | −.5000 |

Rolling friction fingers have an improved capture range and guidance capability over "V" groove fingers. Static coefficients of friction are very unpredictable particularly for "V" groove fingers. The value 0.3 is a reasonable estimate for a static coefficient of friction for dry aluminum against dry aluminum and in space, where frictional values are even more unpredictable, 0.4 is perhaps a more reasonable estimate. Referring to Table 2, if an FMA of 0.6 or better is desired using a standard "V" groove finger as shown in FIG. 14 and assuming a $\mu_S$ of 0.4, a very deep "V" groove with a half angle of 30 degrees must be chosen and this would yield an FMA of 0.6660. This FMA will remain constant throughout the grasping sequence of the gripper. Frictional forces and hence wear and tear on the gripper finger and gripped parts will also occur throughout the sequence. Using rolling friction fingers it was observed that an FMA of 0.6822 occurred (Table 1, $\mu_R$=0.01 and $F_G$=20 lbs.) when contact with the normal to the roller finger is a mere 20 degrees, thus there is a large capture and guidance envelope. And, as the gripper sequence continues, this FMA continues to grow until it approaches 2 (three times that of the 30 degree half angle "V" groove). The drastic reduction in friction allows the fingers to guide the object into its grasp even near the centerline of the rollers. Also, frictional forces and wear and tear on the gripper fingers and gripped parts will essentially be eliminated.

Rolling friction fingers also do not burr or scar either the fingers or the part being grasped as do "V" groove fingers. For scarring to occur work must be done along the contact surface between the fingers and part being grasped. With rolling friction, forces between the fingers and the part being grasped are essentially nil. Also, as illustrated in FIG. 12, with rolling friction the relative motion occurs between the inner and outer races of the recirculating bearings. There is little relative motion between the object and the surface of the rollers. Because very little relative motion and very small frictional forces are present, essentially no work can be done along the contact surface; therefore, no scarring will occur.

Rolling friction fingers provide a superior signal to noise ratio for use with force/tactile sensors than doe° the "V" groove type finger. In FIG. 14 it is shown that when a "V" groove type finger (or any non-rolling type) encounters an object, a frictional force is established in addition to the formal force (FN). The sensors (in the wrist force torque sensor, for example) sense both FN and $F_F$. But $F_F$, being a frictional force, is very unpredictable. And, when the object slides along the finger surface, the object alternately skids and stops as the sliding coefficient of friction alternates between $\mu_{static}$ and $\mu_{dynamic}$. This further confuses the sensing mechanism. Rolling friction fingers eliminate the frictional forces and these attendant problems. Because the contact between the fingers and the object being gripped is low friction, the gripper force and tactile sensors do not have to contend with a large and unpredictable friction vector. Thus, their signal to noise ratio is much improved and the sensor readings are much clearer and more predictable. Also as the object is guided into the robot fingers, the "skipping" motion associated with frictional contacts is avoided and this also improve sensing and improves robot control. In the thermal vacuum of space, where friction is unpredictable, (reportedly ±25%), significant reduction of friction takes on a special importance.

Rolling friction fingers enhance the apparent strength of the gripper motor. This is obvious because the motor does not have to overcome the frictional losses between fingers and the object being grasped. In addition, the effectiveness of the gripper motor is significantly improved. Since the gripper motor no longer has to use a large percentage of its power overcoming friction between the fingers and the object being grasped, it is more efficient and hence able to grip with more force. Also, it consumes less power and thermal problems caused by the motor overheating are reduced.

Rolling friction fingers also can more reliably release an object subjected to side forces and torques; that is, it is more difficult to get an object "jammed" in the gripper fingers. When a robot in space attaches an object to a structure preliminary to releasing the object from the gripper fingers, large residual forces and torques can build between the object and the fingers. Rolling friction fingers will roll easily anyway from and release the object, whereas, fingers using sliding friction hold onto the object and the guidance system also can build up large friction forces, which will impede the ability of the gripper to release the object.

COMPARISON OF ROLLING FRICTION FINGERS WITH SNARE TYPE FINGERS

The rolling friction finger also has several advantages over the snare type end effector for use on medium and small sized robots when the required capture ranges are moderate (on the order of +/−1 inch). Under these conditions a gripper using rolling fingers:

1. Can be made much more compact than can the snare type end effector and still grasp an object without damaging or "burring" it.

2. Will give much better sensory feedback (force and tactile) because it maintains a more solid and precise contact with the object then do the wires of the snare.

3. Can be made much simpler and more reliable than can the snare device and it will still perform equally well the essential tasks of guiding, grasping, locating and holding.

4. Is much less likely to experience difficulties when releasing a grasped object under side forces and torques than a snare device.

ALTERNATE EMBODIMENTS OF THE INVENTION

In addition to the preferred embodiment of this invention, there are several alternate ways to implement this invention which are described below.

Figure 15:
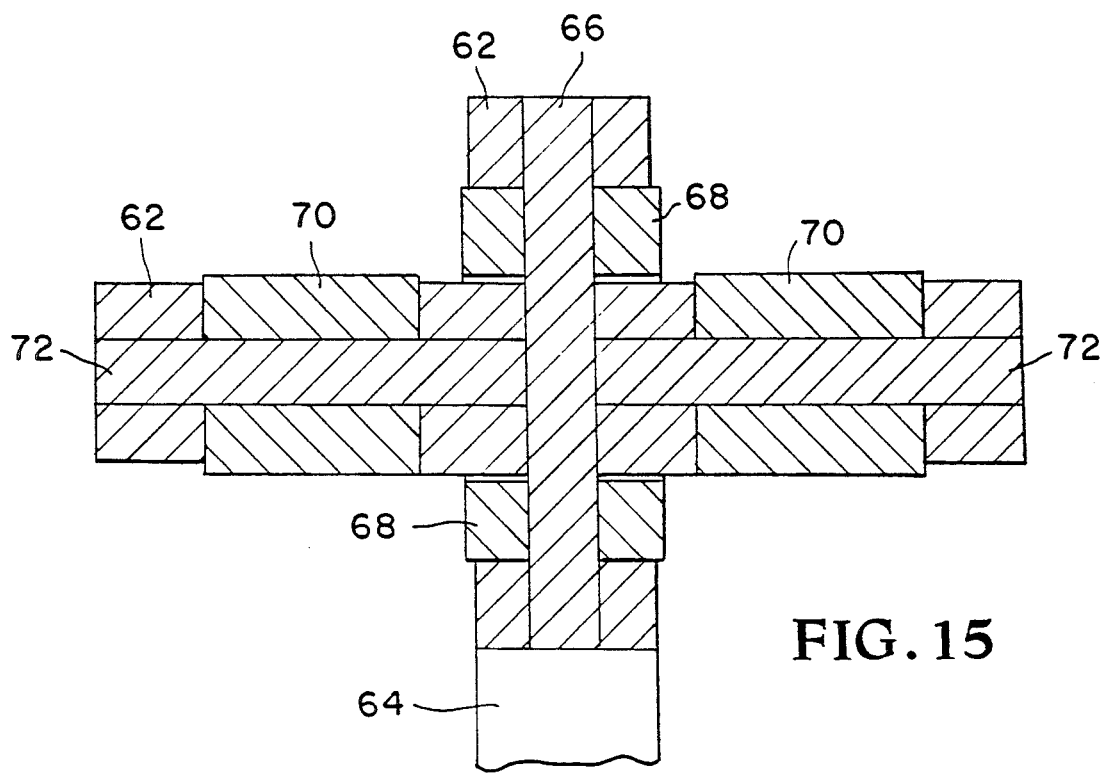
FIG. 15 is a face cross-sectional view of a first alternate embodiment of the rolling friction finger mechanism.
Figure 16:
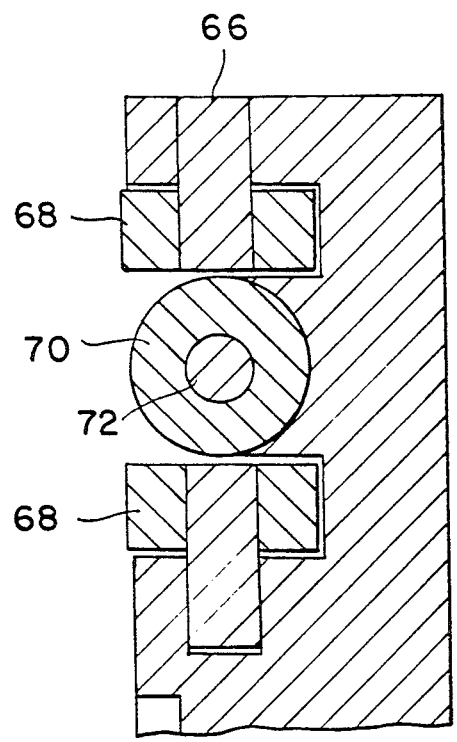
FIG. 16 is a side cross-sectional view of a first alternate embodiment of the rolling friction finger mechanism.

The variation shown in FIGS. 15 and 16 functions in the same manner as described in the preferred embodiment except that the finger design is somewhat simpler in that only four rollers per finger are required rather than five. Shown are two clamping rollers 70 per finger and two centering rollers 68 per finger. As in the preferred embodiment, the finger is supported by finger shaft 64, centering rollers 68 are mounted on bearing shaft 66 which is held by centering roller retainer 62, and clamping rollers 70 are mounted on bearing shafts 72 held by clamping roller retainers 62. In this embodiment, the finger receptacle must be made thicker (2 inches thick rather than 0.5 inches). This version can be much smaller than the preferred embodiment, thereby enabling its use with much smaller robotic objects.

Figure 18:
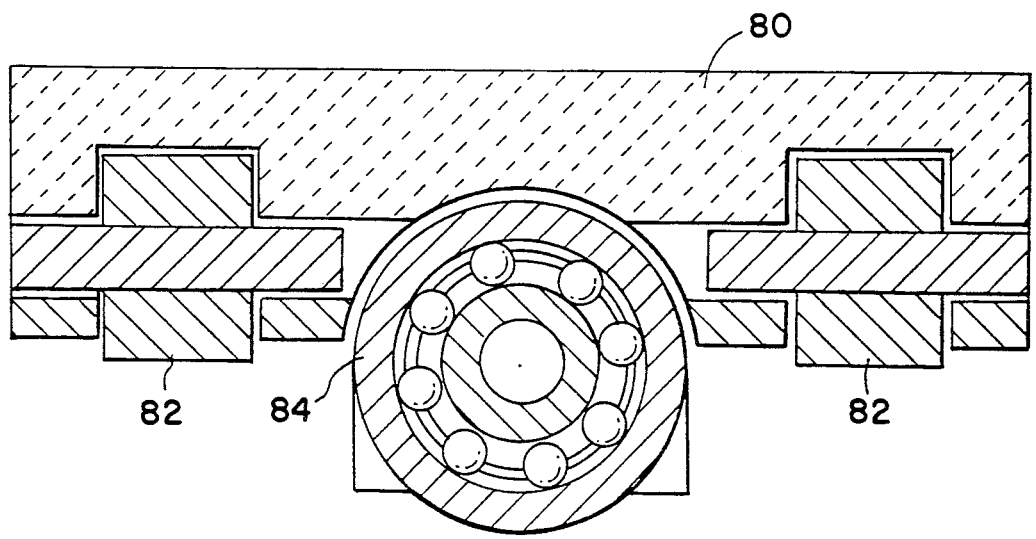
FIG. 18 is a top cross-sectional view of a second alternate embodiment of the rolling friction finger mechanism.
Figure 17:
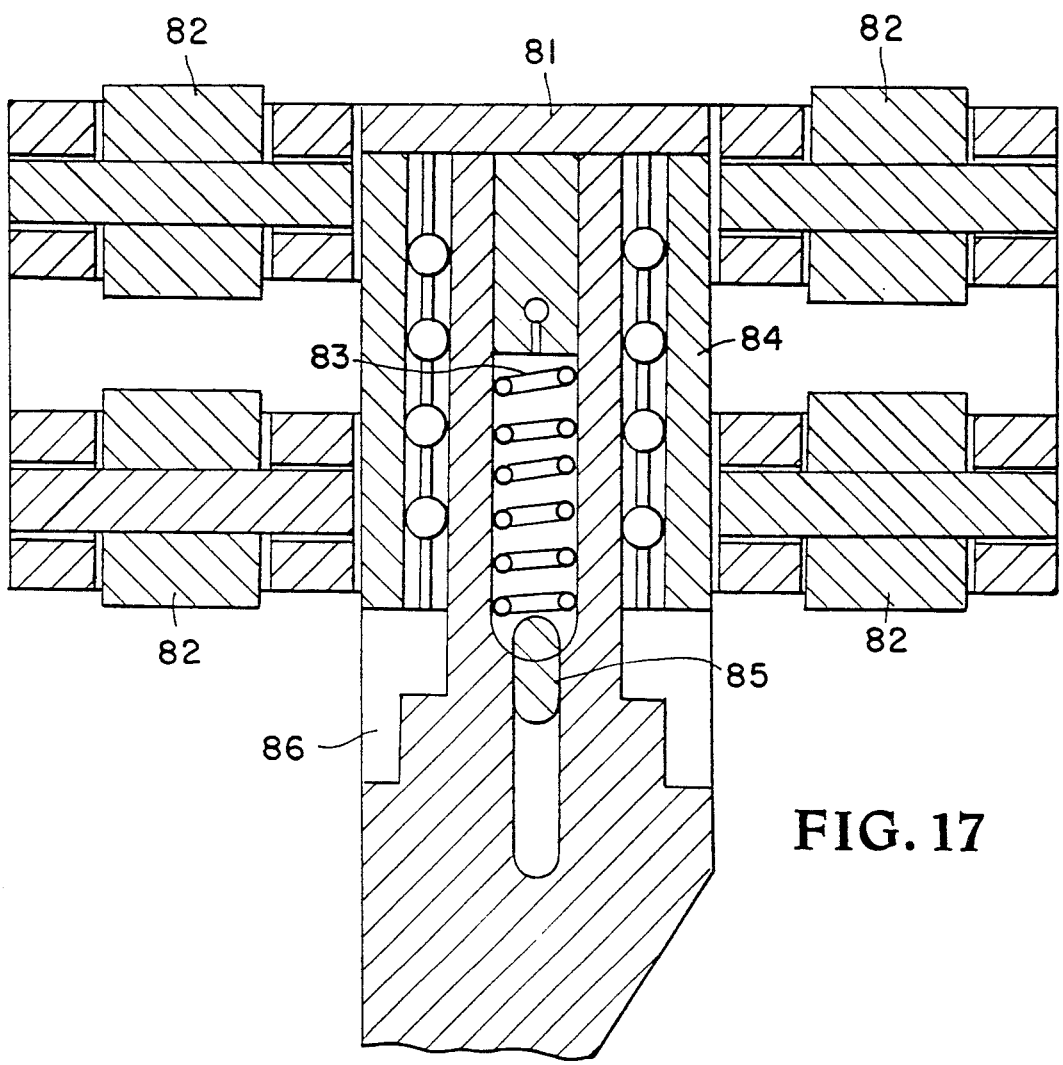
FIG. 17 is a face cross-sectional view of a second alternate embodiment of the rolling friction finger mechanism.

The variation shown in FIGS. 17 and 18 is another variation of the device described in the preferred embodiment. Referring back to FIGS. 7-9, there is a possibility of object to be grasped 34 rubbing against centering roller 30 in the Z direction while clamping rollers 32 were aligning it with respect to Z and twist about Y. This variation eliminates that last possible component of sliding friction by making the centering roller able to both rotate and perform limited translation. Shown in the figures are four clamping rollers 82, a centering roller 84, a bearing retainer 81, a centering spring 83, a spring retainer 85, a bearing way 86 and a roller housing 80.

Figure 23:
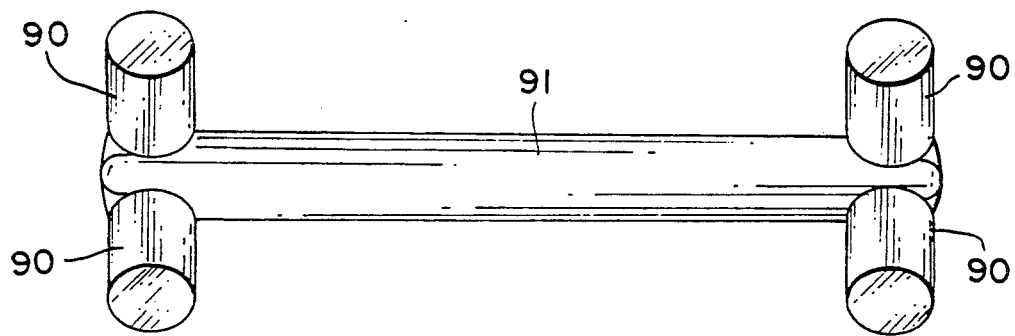
FIG. 23 shows the final seating of the object of FIG. 21 by the third alternate embodiment of the rolling friction finger mechanism.
Figure 19:
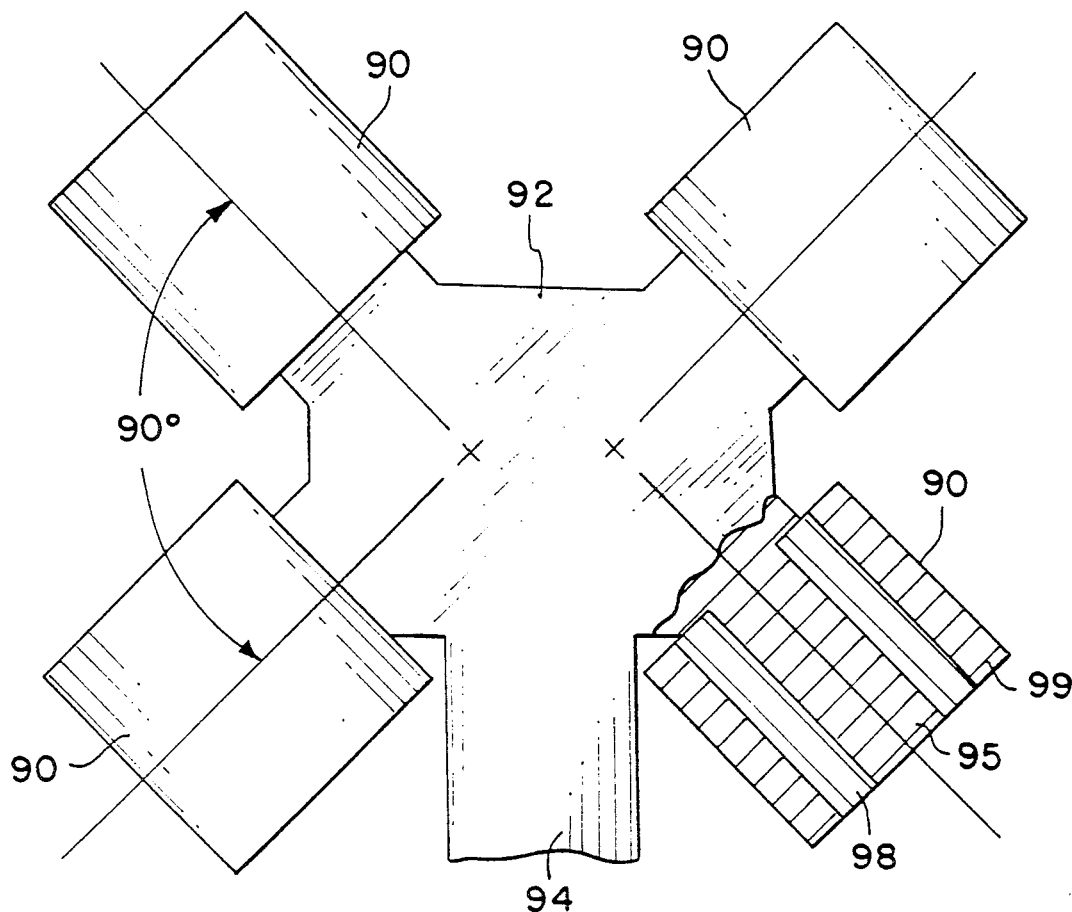
FIG. 19 is a face view of a third alternate embodiment of the rolling friction finger mechanism.
Figure 20:
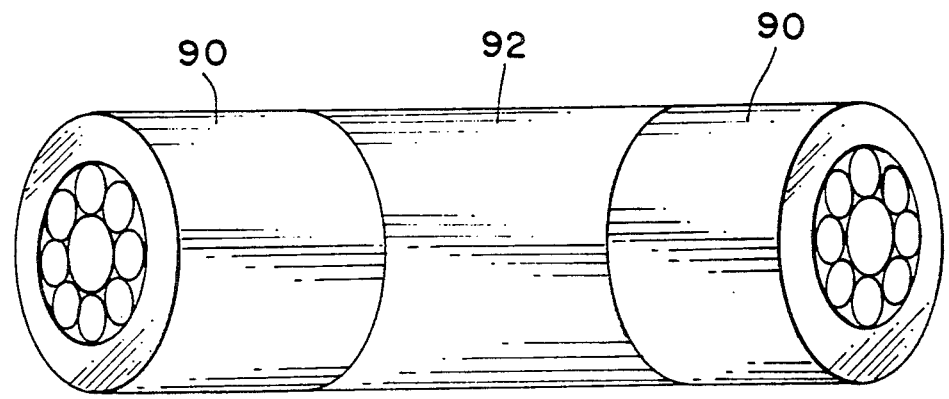
FIG. 20 is a top view of a third alternate embodiment of the rolling friction finger mechanism.
Figure 21C:
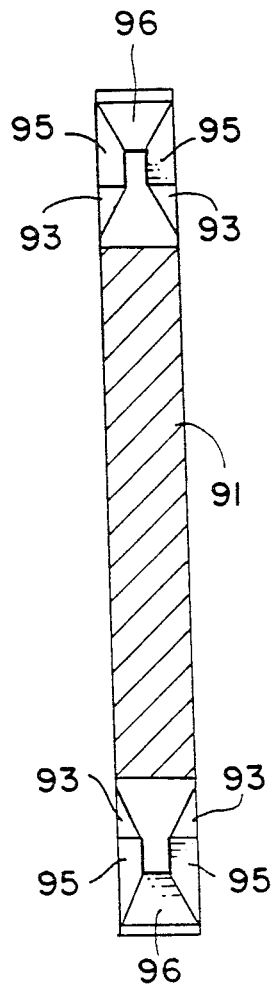
FIGS. 21a, 21b and 21c are illustrations of an object to be grasped by the third alternate embodiment of the rolling friction finger mechanism showing the object's top view, front view and section view along line A—A, respectively.
Figure 21A:
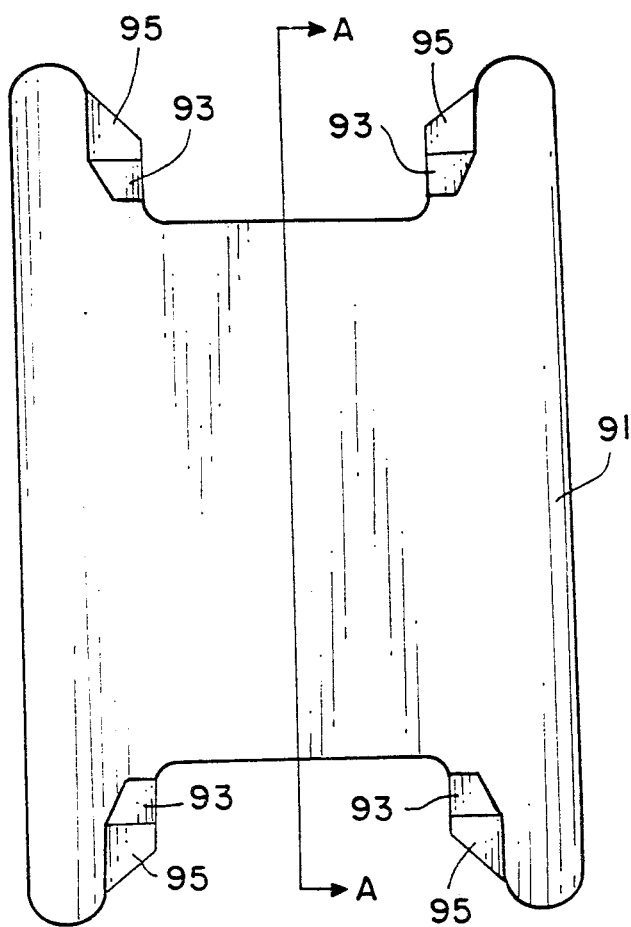
Figure 21B:
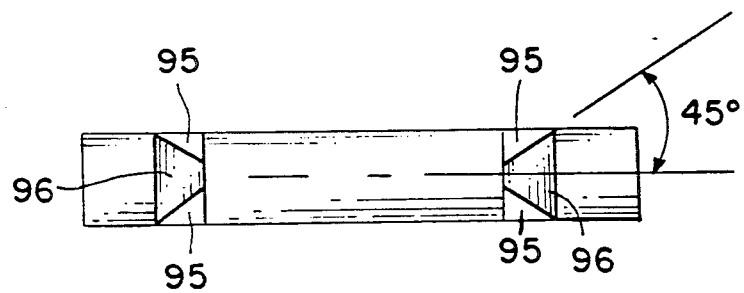
Figure 22A:
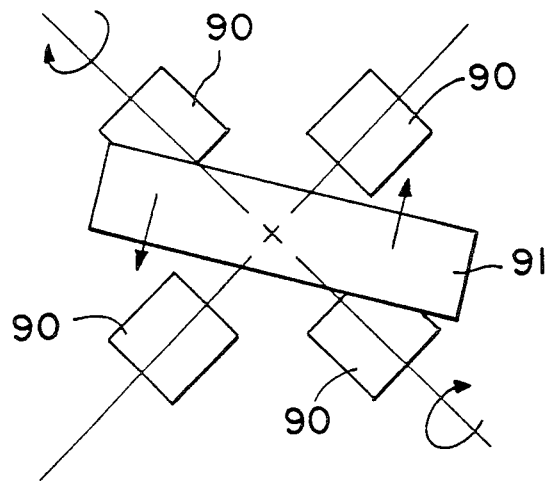
FIGS. 22a is a schematic of how the third alternate embodiment of the rolling friction finger mechanism centers the object of FIG. 21 with respect to twist about the axis.
Figure 22B:
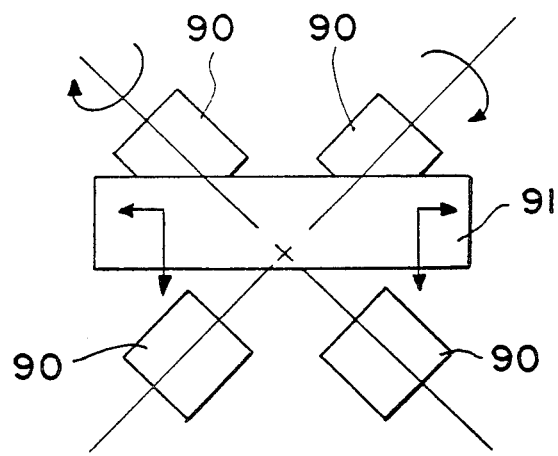
FIG. 22b is a schematic of how the third alternate embodiment of the rolling friction finger mechanism centers the object of FIG. 21 with respect to the Z axis.
Figure 22C:
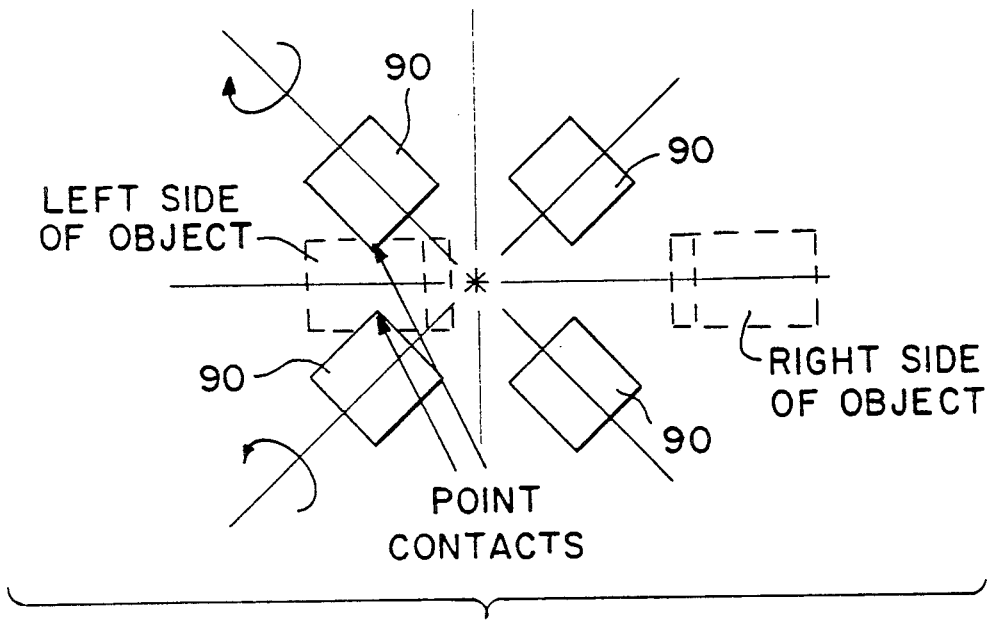
FIG. 22c is a schematic of how the third alternate embodiment of the rolling friction finger mechanism centers the object of FIG. 21 with respect to the X axis.
Figure 22D:
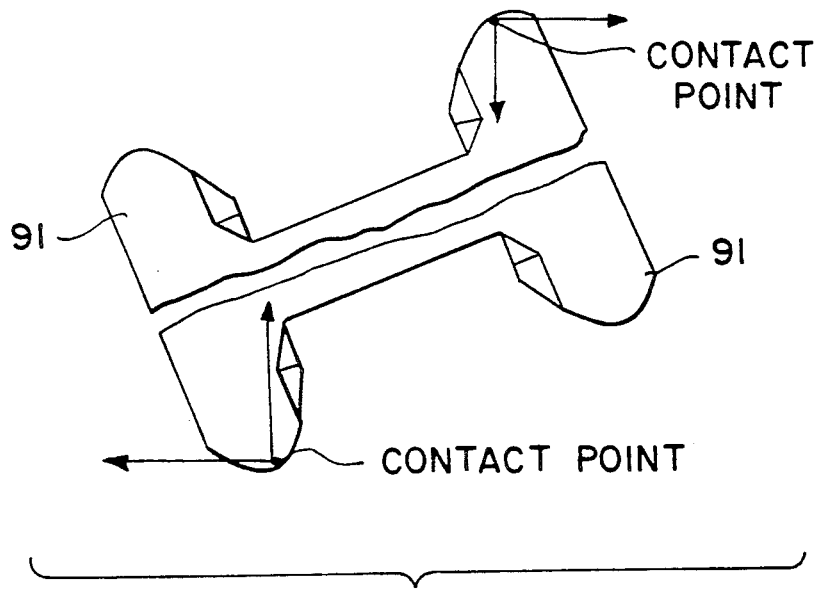
FIG. 22d shows the net alignment forces of the object of FIG. 21 grasped by the third alternate embodiment of the rolling friction finger mechanism.

The variation shown in FIGS. 19 and 20 is called a Roller Cross System because the rollers that make up the left and right fingers are in the form of a cross. Shown are four alignment rollers 90 mounted on a roller housing 92. As in the preferred embodiment, each alignment roller 90 consists of a roller 97 mounted on a bearing 98 which is mounted on a bearing shaft 99. The roller housing 92 is affixed to the gripper housing by a finger shaft 94. FIGS. 21A-21C show the object to be grasped 91 for this embodiment. Note that this object is quite similar to the object shown in FIG. 4 in that it too ha-- a number of "engagements" and functions in much the same manner. Object 91 has two sets of guide planes 95 on either end, two sets of seating planes 93 on either end, and a pair of rotational alignment chamfers 96 on either end. FIGS. 22A and 22B show how this version of the rolling friction finger mechanism centers the object 91 to be grasped with respect to Z, twist about X and twist about Y. FIGS. 22C and 22D show how the object to be grasped 91 is centered with respect to X and twist about Z. FIG. 23 shows the final seating of object 91, to include centering with respect to Y (considering both fingers). This system absolutely constrains the object 91 to be grasped. That is to say, object 91 is fixed in place by direct mechanical contact in all six vectorial directions, thus repeatability will be very good. The variations described previously actually use friction backed up by a mechanical constraint, to locate and hold the object to be grasped in X axis. Thus, there may be an uncertainty in the repeatability each time the gripper grasps an object.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A low friction, object guidance, and gripping finger device for a robotic end effector on a robotic arm, comprising:

a pair of robotic fingers each having a finger shaft slideably located on a gripper housing attached to said end effector;

each of said robotic fingers comprising a roller housing affixed to said finger shaft, said roller housing having one ball-bearing mounted centering roller affixed at the center and two ball bearing mounted clamping rollers affixed one on top of the other on either side of said centering roller;

said object having a recess to engage said centering roller and a plurality of seating ramps to engage said clamping rollers;

said centering roller acting to position and hold said object symmetrically about said centering roller with respect to an X axis;

said clamping rollers acting to position and hold said object with respect to a Y and Z axis;

said X and Y axis being located in a horizontal plane and orthogonal to one another, and said Z axis being located in a vertical plane which is orthogonal to said horizontal plane.

2. The device of claim 1 wherein said rollers are made from a resilient material.

3. The device of claim 1 wherein said roller housing has two ball bearing mounted centering rollers affixed one on top of the other at the center and one ball bearing mounted clamping roller affixed on either side of said centering rollers.

4. The device of claim 1 further including a means for said ball bearing mounted centering roller to rotate and perform limited translation.

5. The device of claim 4 wherein said means for said centering roller to rotate and perform limited translation comprises a two way bearing, a centering spring, a spring retainer, a bearing way and a roller housing.

6. The device of claim 1 wherein said roller housing has four co-planar bearing mounted alignment rollers located thereon, the longitudinal axis of each alignment roller being at 90° to the longitudinal axis of the adjacent alignment bearing.

* * * * *